(12) United States Patent
Lee

(10) Patent No.: US 9,444,508 B2
(45) Date of Patent: Sep. 13, 2016

(54) MAGNETIC PRIVACY FILTER

(71) Applicant: Right Group Co., Ltd., New Taipei (TW)

(72) Inventor: An-Fang Lee, New Taipei (TW)

(73) Assignee: RIGHT GROUP CO., LTD., New Taipei (TW)

( * ) Notice: Subject to any disclaimer, the term of this patent is extended or adjusted under 35 U.S.C. 154(b) by 0 days.

(21) Appl. No.: 14/853,002

(22) Filed: Sep. 14, 2015

(65) Prior Publication Data

US 2016/0087670 A1 Mar. 24, 2016

(30) Foreign Application Priority Data

Sep. 19, 2014 (TW) .............................. 103216691 U
Jul. 29, 2015 (JP) ................................. 2015-003837

(51) Int. Cl.
*H04M 1/00* (2006.01)
*H04B 1/3888* (2015.01)
*H04M 1/02* (2006.01)

(52) U.S. Cl.
CPC ......... *H04B 1/3888* (2013.01); *H04M 1/0202* (2013.01); *G09G 2358/00* (2013.01); *H04M 1/0266* (2013.01)

(58) Field of Classification Search
CPC .. G06F 1/1616; G06F 1/1652; G06F 1/1656; G06F 1/1681; G06F 1/181; G06F 2200/1633; G06F 3/041; A44D 2203/00; B29C 65/48; B29C 65/562; B29C 70/70; B29C 70/84; F16B 2001/0035; H04M 1/0216; H04M 1/022; H04M 1/0254; H04M 1/0268; H04M 1/72527; H04N 5/2254
USPC ...................................................... 455/575.8
See application file for complete search history.

(56) References Cited

U.S. PATENT DOCUMENTS 8,537,531 B2 * 9/2013 Gotham .................... H05K 5/02
345/175
2014/0151248 A1 * 6/2014 Hurst .................. A45C 13/1069
206/45.23

FOREIGN PATENT DOCUMENTS

TW M418790 U 12/2011
TW M444544 U 1/2013
TW M475353 U 4/2014
TW M482757 U 7/2014

* cited by examiner

Primary Examiner — Tu X Nguyen
(74) Attorney, Agent, or Firm — McClure, Qualey & Rodack, LLP

(57) ABSTRACT

A magnetic privacy filter is disclosed. The magnetic privacy filter is adapted to protect the screen of a mobile device and has an anti-peep function. The magnetic privacy filter includes a filtering element and several ferromagnetic elements embedded in the filtering element. Accordingly, when the anti-peep function is needed, the magnetic privacy filter is adhered to the screen of the mobile device; while when the anti-peep function is not needed, the magnetic privacy filter can be detached from the mobile device instantly.

18 Claims, 7 Drawing Sheets

MAGNETIC PRIVACY FILTER

CROSS-REFERENCES TO RELATED APPLICATIONS

This non-provisional application claims priority under 35 U.S.C. §119(a) on Patent Application No. 103216691 filed in Taiwan, R.O.C. on 2014 Sep. 19 and on Patent Application No. 2015-003837 filed in Japan on 2015 Jul. 29, the entire contents of which are hereby incorporated by reference.

BACKGROUND

1. Technical Field

The instant disclosure relates to a magnetic privacy filter, and particularly relates to a magnetic privacy filter utilizing the magnetic force to adhere the filter to or detached from a mobile device instantly, according to user's desire.

2. Related Art

With the advancement of technology, people enjoy convenient net-surfing with mobile devices, such as smart phones, tablet computers, personal digital assistants (PDA), or portable multimedia players, and the usage rate of the aforementioned mobile devices is increased continuously. According to the Worldwide Quarterly Mobile Phone Tracker report made by International Data Corporation (IDC), in 2014, the total shipment of smart phones goes to 1.2 billion. In addition, according to a statistics in Taiwan, the number of the people in Taiwan who have smart phones or tablet computers already reaches to 13.3 million (total population of Taiwan is 23 million), and more than 20 percent of them both have a smart phone and a tablet computer. Accordingly, mobile devices are necessities for nowadays human beings. Furthermore, the place where the users may use mobile devices, mostly, is the residence, having a percentage of 66.5; and then, the work place, having a percentage of 33.1; and followed by mass transits (28.7%), public places (20.1%), schools (16.7%), and dining places (12.4%). From this statistics, one can observe the users would mostly use their mobile devices in public. However, when a user uses his/her mobile device, a person nearby may view the screen of the device with curiosity, leading the privacy of the user being unprotected. Therefore, privacy filters (or called privacy films), are developed to be fixed to the screen of a mobile device by means of adhering or applying an external frame structure to secure the filter with the screen, e.g., Taiwan Patent Publication Number M418790 "anti-peep assembly for screen of tablet computer" and Taiwan Patent Publication Number M444544 "external frame structure for tablet electronic device". Furthermore, protective cases having privacy filters are also developed, e.g., Taiwan Patent Publication Number M475353 "protective device for mobile terminal" and Taiwan Patent Publication Number M482757 "protective case for mobile device".

Conventionally, the privacy filter is directly adhered to the screen of a mobile device, or is assembled on a protective case for mobile device. However, if the privacy filter is fixed on the screen by means of adhesive, parts of adhesive may be still left on the screen when the user tears the filter off the screen. Besides, in such condition, the user cannot freely determine whether or not the privacy filter is utilized for the mobile device when the user is in different occasions. Moreover, since the application of privacy filter reduces the brightness of the screen and lowers the sharpness of the displayed image, the user would suffer vision loss easily after long term use. Yet, for a protective case having privacy filter, since the filter is not securely fixed with the screen of the mobile device, the privacy filter cannot be securely attached to the screen of the mobile device during operation, such that the definition of the displayed image and the preciseness of the touch are adversely affected. Therefore, the conventional are to be improved.

SUMMARY

In view of these, based on relevant manufacturing experiences, the inventor of the instant disclosure has studied and analyzed the structure of the conventional privacy filter so as to provide a product which is capable of solving the problem in the conventional. Accordingly, a magnetic privacy filter which can be rapidly assembled or detached from the screen of a mobile device, is provided.

In one embodiment, the magnetic privacy filter comprises a filtering element defining a plurality of positioning holes thereon. A plurality of ferromagnetic elements is respectively embedded into the positioning holes, and the surfaces of the ferromagnetic elements are lower than or aligned with the surface of the filtering element when the ferromagnetic elements are embedded into the positioning holes. The positions of the positioning holes may correspond to the positions of built-in magnetic members which are intrinsically built around the screen of a mobile device. Therefore, by the magnetic force between the built-in magnetic members and the ferromagnetic elements, the magnetic privacy filter can be closely adhered to the screen of the mobile device in a rapid manner. Hence, the magnetic privacy filter can be rapidly and properly positioned with the screen of the mobile device.

BRIEF DESCRIPTION OF THE DRAWINGS

The disclosure will become more fully understood from the detailed description given herein accompanying by the following figures, which are for illustration only, and thus not limitative of the disclosure, wherein.

DETAILED DESCRIPTION

Figure 1:
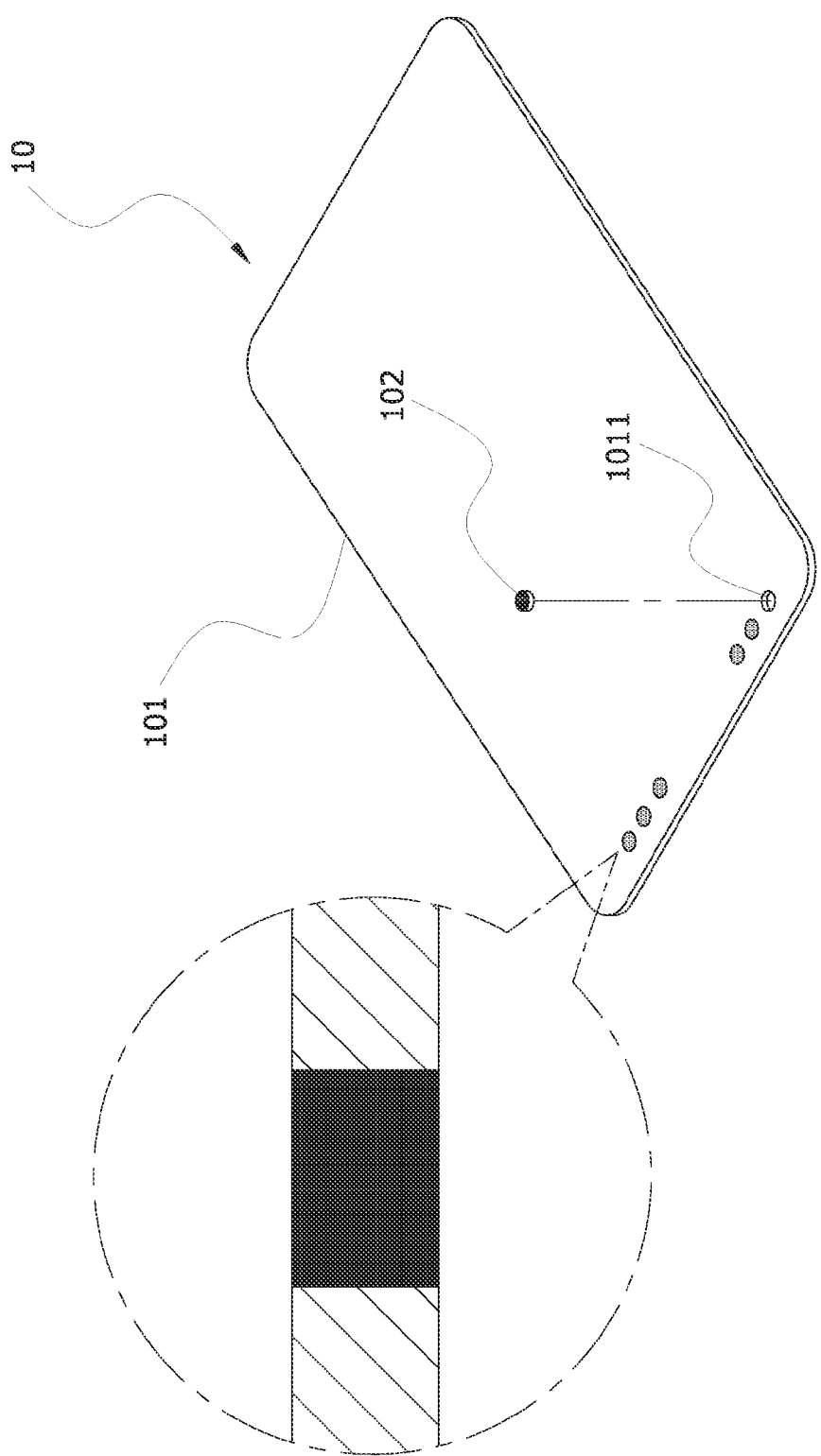
FIG. 1 illustrates a perspective view of an exemplary embodiment of a magnetic privacy filter of the instant disclosure.

Please refer to FIG. 1, which illustrates a perspective view of an exemplary embodiment of a magnetic privacy filter 10 of the instant disclosure. Privacy filter may be referred to anti-glare film/ plate, anti-peeping film/ plate, privacy plate/ film, and so forth. As shown, the magnetic privacy filter 10 comprises a filtering element 101 and a plurality of ferromagnetic elements 102. The filtering element 101 has a plurality of positioning holes 1011 formed thereon, and the positioning holes 1011 are defined at the same edge portion of the filtering element 101. Besides, the ferromagnetic elements 102 are provided to be embedded into the positioning holes 1011, and the surfaces of the ferromagnetic elements 102 are lower than or aligned with (i.e., substantially equal to) the surface of the filtering element 101 after the ferromagnetic elements 102 are embedded into the positioning holes 1011. That is, the surface of the magnetic privacy filter 10 is even and does not protrude over the surface of the filtering element 101 after the ferromagnetic elements 102 are embedded into the positioning holes 1011. Accordingly, the magnetic privacy filter 10 can be closely adhered to a mobile device (not shown in FIG. 1) having built-in magnetic members by magnetic force, improving the drawback in the conventional, i.e., the issue that the conventional filter cannot be securely fixed with the screen of the mobile device. Besides, the ferromagnetic elements 102 may be, but not limited to, made of ferrite, alnico, rare-earth magnet, etc.

Figure 2:
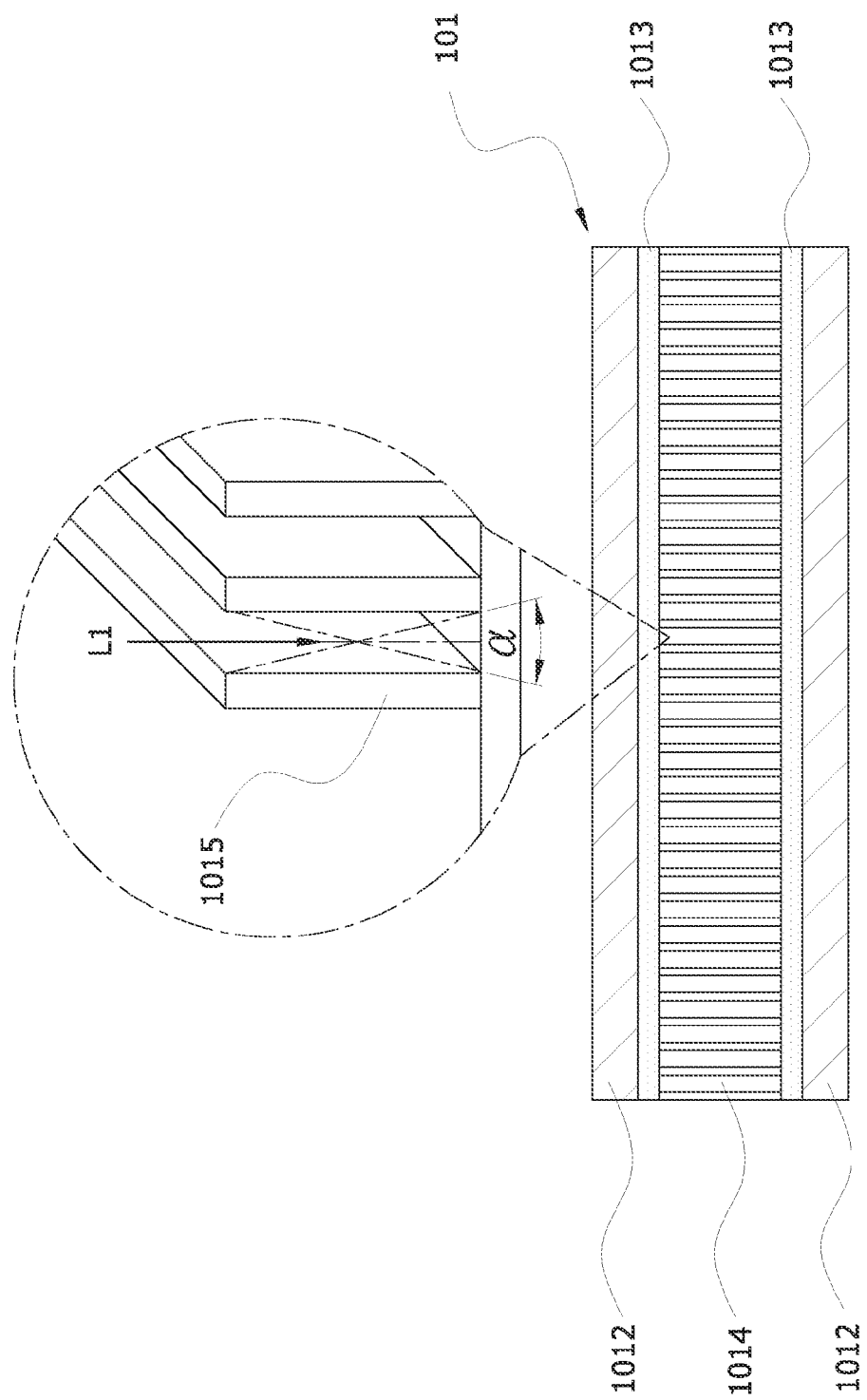
FIG. 2 illustrates a sectional view of an embodiment of a filtering element of the magnetic privacy filter, in which the detail structure of a grating layer of the filtering element is shown.

Please refer to FIG. 2, which illustrates a sectional view of an embodiment of a filtering element 101 of the magnetic privacy filter 10, and the detail structure of a grating layer 1014 of the filtering element 101 is shown. As shown, the filtering element 101 comprises, from the top to the bottom and in order, a resin layer 1012 (first resin layer), an adhesive layer 1013 (first adhesive layer), a grating layer 1014, an adhesive layer 1013 (second adhesive layer), and a resin layer 1012 (second resin layer). The resin layers 1012 are made of materials with high transmittance, for example, the resin layers 1012 may be, but not limited to, made of polycarbonate (PC), polyethylene terephthalate (PET), etc. Besides, the adhesive layers 1013 are binders provided for securely binding the two resin layers 1012 with the grating layer 1014. The grating layer 1014 includes a plurality of opaque grating sheets 1015 and is implemented by microlouver principle. The grating sheets 1015 are equidistantly and parallel arranged to form the grating layer 1014 (i.e., the grating sheets 1015 form a louver structure). Therefore, the parallel and equidistantly-disposed grating sheets 1015 only allows light beams with a certain angle α to go therethrough. In other words, the viewing angle of the grating layer 1014 is the angle α. For example, when a user sees through the filtering element 101 directly from up-right, (i.e., the angle between the normal line of the grating layer 1014 and the eyesight L1 of the user is zero which is within the angle α), the visibility to see through the filtering element 101 is not affected since the eyesight of the user is not retarded by the grating layer 1014. Instead, if someone tends to peep the information or image displayed on the screen of the user's mobile device in which the mobile device 20 has the magnetic privacy filter 10, he/she would have a poor visibility for the information or image since the angle between the orientation of his/her eyesight and the normal line of the grating layer 1014 exceeds the certain angle α. Therefore, anti-peep and secret-keeping function can be performed sufficiently.

Figure 3:
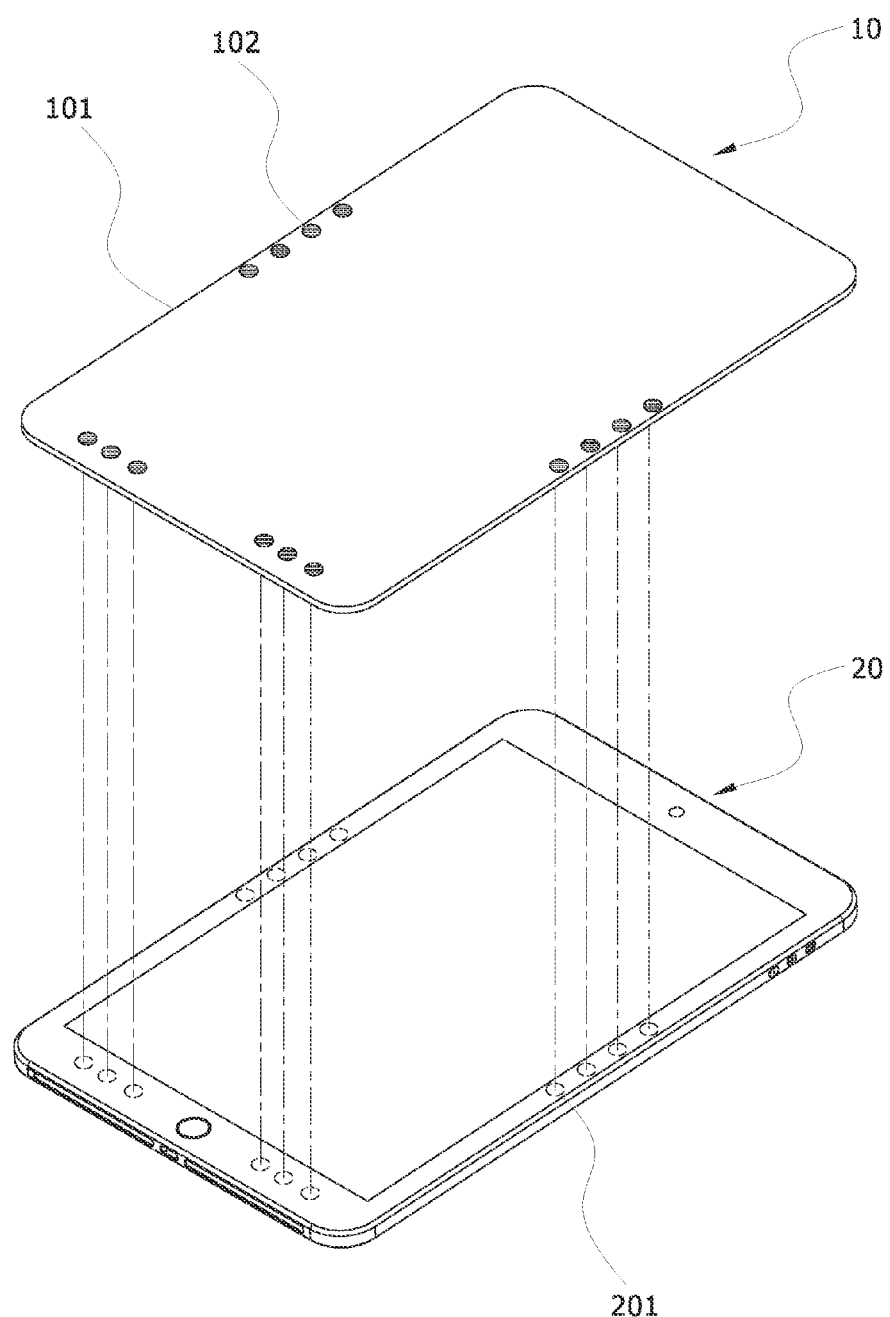
FIG. 3 illustrates a schematic view showing an embodiment of a magnetic privacy filter is to be adhered to a mobile device.

FIG. 3 illustrates a schematic view showing an embodiment of a magnetic privacy filter 10 is to be adhered to a mobile device 20. Please refer to FIGS. 1 and 3, the magnetic privacy filter 10 comprises a filtering element 101 and a plurality of ferromagnetic elements 102. The filtering element 101 has a plurality of positioning holes 1011 formed thereon. The ferromagnetic elements 102 are embedded into the positioning holes 1011. Since a plurality of built-in magnetic members 201 is predefined in the mobile device 20 and around the screen, the magnetic privacy filter 10 can be instantly adhered to the screen of the mobile device 20 by the magnetic force between the built-in magnetic members 201 of the mobile device 20 and the ferromagnetic elements 102 of the magnetic privacy filter 10, according to user's desire. Therefore, the drawback found in the conventional, i.e., the issue that the conventional privacy cannot be freely adhered to or detached from the mobile device, can be improved. Besides, in an embodiment, the positions of the positioning holes 1011 correspond to the positions of the built-in magnetic members 201 which are intrinsically built around the screen of the mobile device 20. Therefore, based on a point-to-point manner, the ferromagnetic elements 102 are adhered to the built-in magnetic members 201, so that the magnetic privacy filter 10 can be positioned with the mobile device 20 rapidly.

Figure 4:
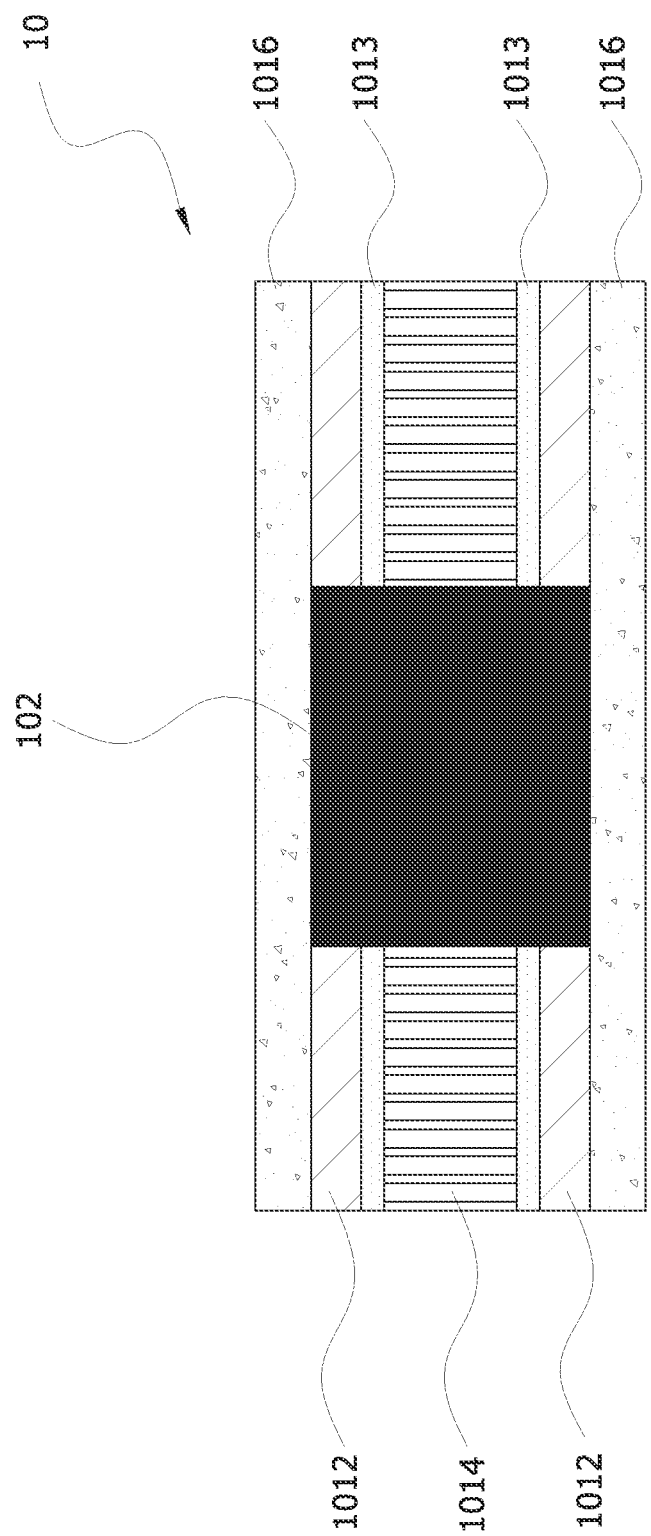
FIG. 4 illustrates a sectional view of another embodiment of a filtering element of the exemplary embodiment of the magnetic privacy filter.
Figure 5:
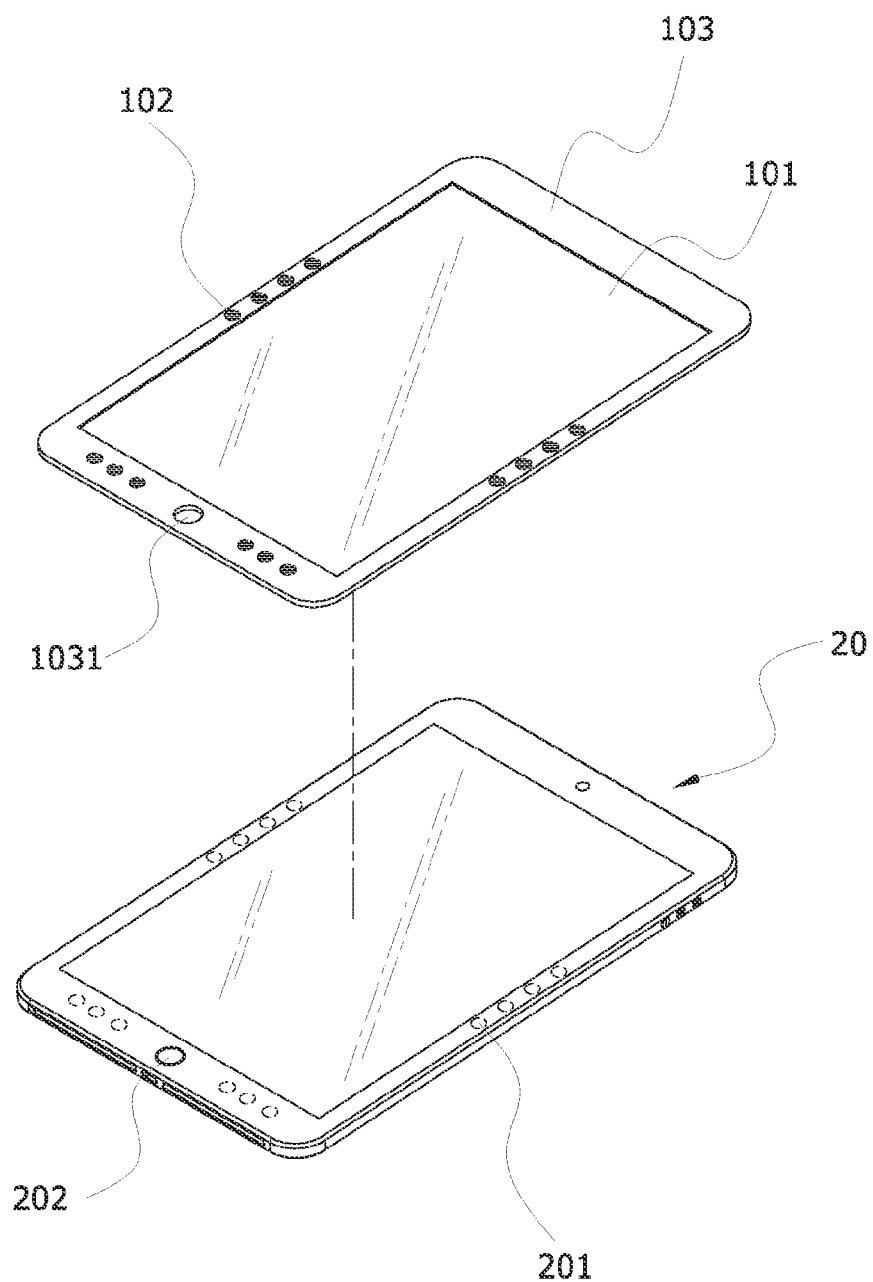
FIG. 5 illustrates a schematic view showing another embodiment of a magnetic privacy filter is to be adhered to a mobile device.

Please refer to FIG. 4, which illustrates a sectional view of another embodiment of a filtering element 101 of the exemplary embodiment of the magnetic privacy filter 10. As shown, the filtering element 101 further comprises a protecting layer 1016. The protecting layer 1016 may be simultaneously disposed at the topmost layer of the filtering element 101 and the bottommost layer of the filtering element 101 so as to cover the ferromagnetic elements 102. The protecting layer 1016 may be made of a transparent plastic material processed by fluoro compounds so as to be dustproof, water repellant, and wear resistant. Besides, the protecting layer 1016 may be, but not limited to, made of polycarbonate (PC), polymethylmethacrylate (PMMA), polyethylene (PE), polyvinylchloride (PVC), polyethylene terephthalate (PET), or any combinations thereof. FIG. 5 illustrates a schematic view showing another embodiment of a magnetic privacy filter 10 is to be adhered to a mobile device 20. Please refer to FIGS. 1 and 5, the ferromagnetic elements 102 are embedded into the positioning holes 1011 of the filtering element 101, the surfaces of the ferromagnetic elements 102 are aligned with the surface of the filtering element 101, and a frame 103 is provided to be disposed on the surface of the filtering element 101. The frame 103 has an operation hole 1031 formed thereon, and the operation hole 1031 corresponds to an operation button 202 of the mobile device 20. Accordingly, the operation button 202 can be operated when the filtering element 101 is adhered with the screen of the mobile device 20. Moreover, the frame 103 allows the ferromagnetic elements 102 to be firmly restricted in the positioning holes 1011. The frame 103 made be, but not limited to, made of leather or plastic.

Figure 6:
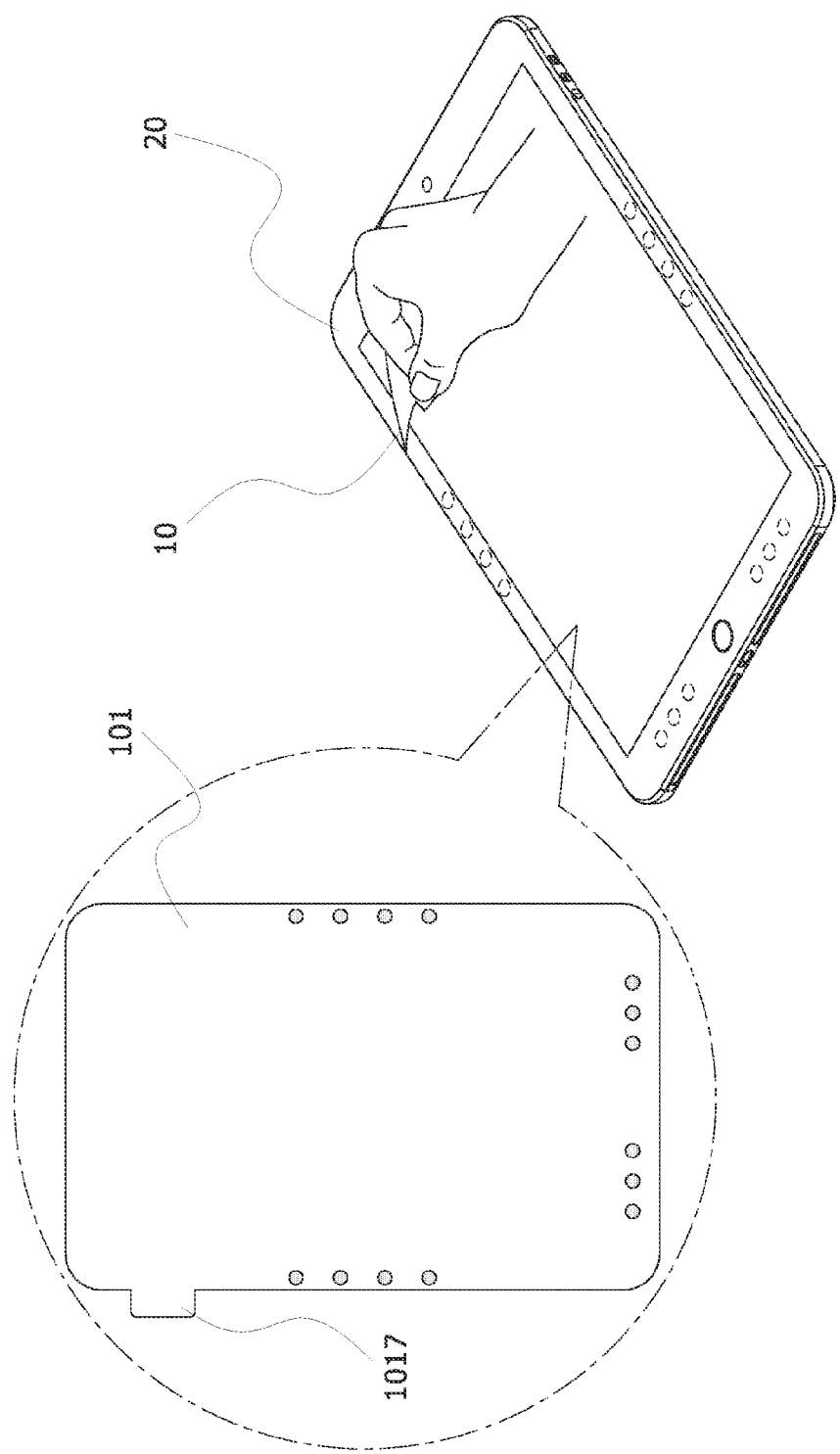
FIG. 6 illustrates a schematic view showing yet another embodiment of a magnetic privacy filter is to be adhered to a mobile device.

Please refer to FIG. 6, which illustrates a schematic view showing yet another embodiment of a magnetic privacy filter 10 is to be adhered to a mobile device 20. As shown, a liftable portion 1017 is formed on the filtering element 101. Therefore, when the user does not need the filtering element 101, the user can tear the magnetic privacy filter 10 from the screen of the mobile device 20 by taking the liftable portion 1017, so that the magnetic privacy filter 10 can be detached from or assembled to the mobile device 20 easily and rapidly, improving the drawback in the conventional.

Figure 7:
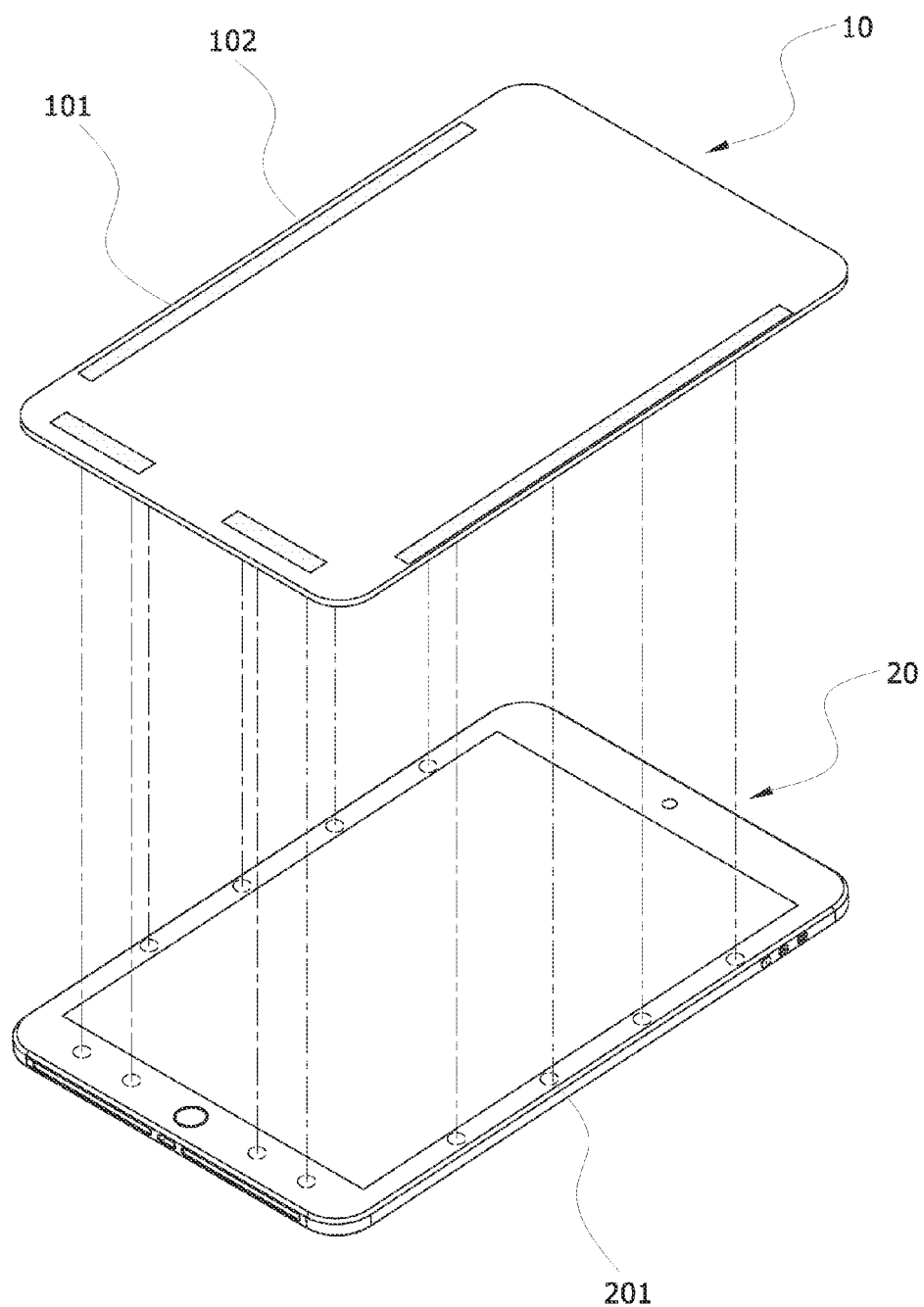
FIG. 7 illustrates a schematic view showing still another embodiment of a magnetic privacy filter is to be adhered to a mobile device.

Please refer to FIG. 7. A plurality of built-in magnetic members 201 is predefined around the screen of a mobile device 20. The ferromagnetic elements 102 (or the built-in magnetic members 201) are of elongated bar shape, for example, the ferromagnetic elements 102 (or the built-in magnetic members 201) may be, but not limited to, barred magnets. Accordingly, the magnetic privacy filter 10 can be securely adhered to the mobile device 20 by the magnetic force between the built-in magnetic members 201 and the ferromagnetic elements 102, in which several built-in magnetic members 201 are interacted with one ferromagnetic element 102, and vise versa. Therefore, the magnetic privacy filter 10 can be directly adhered on the screen so as to be positioned on the mobile device 20 steadily and rapidly.

Based on the above, according to embodiments of the instant disclosure, ferromagnetic elements are embedded into positioning holes of a filtering element, and the surface of the assembled filtering element is even. Besides, by the application of the microlouver principle, the filtering element is allowed to be seen through within a certain angle range, thus the filtering element providing an anti-peep function. Accordingly, when the anti-peep function for the mobile device is needed, the magnetic privacy filter is adhered to a mobile device having several built-in magnetic members. While, when the anti-peep function for the mobile device is not needed, the magnetic privacy filter can be detached from the mobile device instantly.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A magnetic privacy filter, adapted to be adhered to a screen of a mobile device having a plurality of built-in magnetic members, wherein the magnetic privacy filter comprises:
 a filtering element having a plurality of positioning holes formed thereon, wherein the filtering element comprises, from the top to the bottom and in order, a first resin layer, a first adhesive layer, a grating layer, a second adhesive layer, and a second resin layer; and
 a plurality of ferromagnetic elements respectively embedded into the positioning holes.

2. The magnetic privacy filter according to claim 1, wherein surfaces of the ferromagnetic elements are lower than or aligned with a surface of the filtering element.

3. The magnetic privacy filter according to claim 2, wherein the positions of the positioning holes correspond to the positions of the magnetic members.

4. The magnetic privacy filter according to claim 3, wherein the positioning holes are defined at the same edge portion of the filtering element.

5. The magnetic privacy filter according to claim 4, wherein the ferromagnetic elements are of elongated bar shape.

6. The magnetic privacy filter according to claim 3, wherein the ferromagnetic elements are of elongated bar shape.

7. The magnetic privacy filter according to claim 2, wherein the ferromagnetic elements are of elongated bar shape.

8. The magnetic privacy filter according to claim 1, wherein the grating layer is adapted to allow a light beam to go through the filtering element within a certain angle range.

9. The magnetic privacy filter according to claim 8, wherein the ferromagnetic elements are of elongated bar shape.

10. The magnetic privacy filter according to claim 1, wherein the filtering element further comprises a protecting layer disposed at the topmost layer of the filtering element and the bottommost layer of the filtering element, and the protecting layer covers the ferromagnetic elements.

11. The magnetic privacy filter according to claim 10, wherein a frame is disposed on a surface of the filtering element.

12. The magnetic privacy filter according to claim 11, wherein an operation hole is preformed on the frame.

13. The magnetic privacy filter according to claim 12, wherein the ferromagnetic elements are of elongated bar shape.

14. The magnetic privacy filter according to claim 11, wherein the ferromagnetic elements are of elongated bar shape.

15. The magnetic privacy filter according to claim 10, wherein a liftable portion is formed on the filtering element.

16. The magnetic privacy filter according to claim 15, wherein the ferromagnetic elements are of elongated bar shape.

17. The magnetic privacy filter according to claim 10, wherein the ferromagnetic elements are of elongated bar shape.

18. The magnetic privacy filter according to claim 1, wherein the ferromagnetic elements are of elongated bar shape.

* * * * *